(12) United States Patent
Phuyal et al.

(10) Patent No.: US 9,942,944 B2
(45) Date of Patent: Apr. 10, 2018

(54) NETWORK-INITIATED DISCOVERY AND PATH SELECTION PROCEDURES FOR MULTI-HOP UNDERLAY NETWORKS

(71) Applicant: Intel IP Corporation, Santa Clara, CA (US)

(72) Inventors: Umesh Phuyal, Hillsboro, OR (US); Candy Yiu, Portland, OR (US); Youn Hyoung Heo, San Jose, CA (US); Hong He, Beijing (CN)

(73) Assignee: Intel IP Corporation, Santa Clara, CA (US)

( * ) Notice: Subject to any disclaimer, the term of this patent is extended or adjusted under 35 U.S.C. 154(b) by 196 days.

(21) Appl. No.: 14/729,511

(22) Filed: Jun. 3, 2015

(65) Prior Publication Data

US 2016/0192439 A1    Jun. 30, 2016

Related U.S. Application Data

(60) Provisional application No. 62/097,456, filed on Dec. 29, 2014.

(51) Int. Cl.
*H04W 88/04* (2009.01)
*H04L 5/00* (2006.01)
(Continued)

(52) U.S. Cl.
CPC .......... *H04W 88/04* (2013.01); *H04L 5/0048* (2013.01); *H04W 76/023* (2013.01); *H04W 40/02* (2013.01); *Y02B 60/50* (2013.01)

(58) Field of Classification Search
None
See application file for complete search history.

(56) References Cited

U.S. PATENT DOCUMENTS 8,559,867 B2 * 10/2013 Li .................... H04B 7/2606
                                                    455/7
9,131,510 B2 *  9/2015 Wang ................. H04W 72/08
(Continued)

FOREIGN PATENT DOCUMENTS

CN      102111844 A     6/2011
CN      107113689 A     8/2017

OTHER PUBLICATIONS

"International Application Serial No. PCT/US2015/060655, International Search Report dated Apr. 22, 2016".

(Continued)

*Primary Examiner* — Donald Mills
(74) *Attorney, Agent, or Firm* — Schwegman Lundberg & Woessner, P.A.

(57) ABSTRACT

Described herein are processes related to discovering and establishing suitable multi-hop communication paths for (endpoint) user equipments (UEs). A network-initiated discovery and path selection processes may utilize periodically transmitted reference signals along with optional assistance information. A network node, such an eNodeB, and other relaying-capable nodes, such as relay UEs, may transmit periodic reference signals. Based on these transmitted reference signals and optional assistance information, the relay UEs and/or an endpoint node (e.g., the eNodeB or the endpoint UE) may make a selection decision for previous hop paths for communication. The endpoint UE or the eNodeB may make the selection decision for the end-to-end path in order to provide coverage extension for the end UE using multi-hop transmission paths.

30 Claims, 9 Drawing Sheets

(51) Int. Cl.
*H04W 76/02* (2009.01)
*H04W 40/02* (2009.01)

(56) References Cited

U.S. PATENT DOCUMENTS

| | | | |
|---|---|---|---|
| 2003/0204587 A1* | 10/2003 | Billhartz | H04L 43/0852 709/224 |
| 2006/0199530 A1 | 9/2006 | Kawasaki | |
| 2007/0142056 A1* | 6/2007 | Harris | H04W 28/24 455/452.2 |
| 2008/0057973 A1 | 3/2008 | Park | |
| 2008/0188177 A1 | 8/2008 | Tan et al. | |
| 2011/0134827 A1 | 6/2011 | Hooli et al. | |
| 2011/0164527 A1* | 7/2011 | Mishra | H04L 45/123 370/252 |
| 2013/0107768 A1* | 5/2013 | Murakami | H04W 40/10 370/310 |
| 2013/0195026 A1* | 8/2013 | Johnsson | H04W 72/0493 370/329 |
| 2014/0066119 A1 | 3/2014 | Tavildar et al. | |
| 2014/0153390 A1* | 6/2014 | Ishii | H04W 76/023 370/230 |
| 2015/0009915 A1* | 1/2015 | Baek | H04W 36/00 370/329 |
| 2015/0358888 A1* | 12/2015 | Gulati | H04W 40/02 370/329 |
| 2016/0044613 A1* | 2/2016 | Cai | H04W 56/00 370/315 |
| 2016/0057761 A1* | 2/2016 | Panaitopol | H04W 72/085 370/329 |
| 2016/0142897 A1* | 5/2016 | Sorrentino | H04W 8/005 370/329 |

OTHER PUBLICATIONS

"International Application Serial No. PCT/US2015/060655, Written Opinion dated Apr. 22, 2016".

"Taiwanese Application Serial No. 104139439, Office Action dated Oct. 12, 2016", with English Translation, 19 pgs.

\* cited by examiner

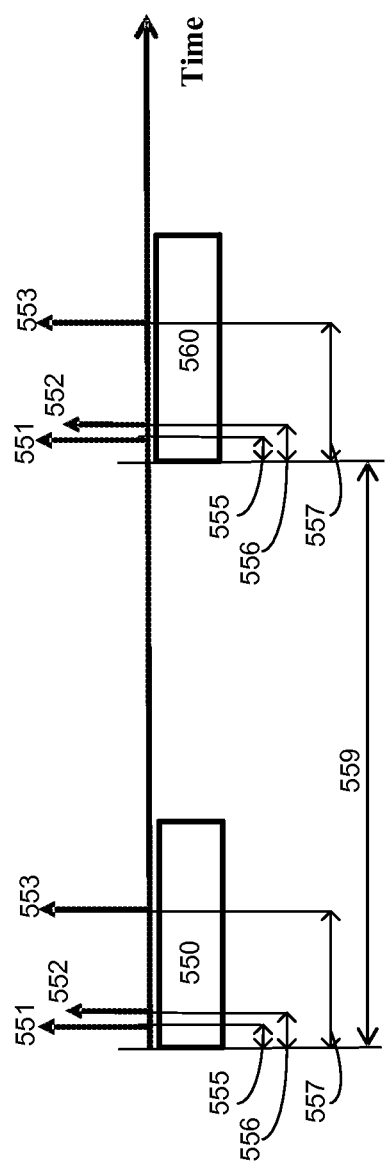

US 9,942,944 B2

NETWORK-INITIATED DISCOVERY AND PATH SELECTION PROCEDURES FOR MULTI-HOP UNDERLAY NETWORKS

PRIORITY CLAIM

This application claims the benefit of U.S. Provisional Application No. 62/097,456, filed Dec. 29, 2014, the entire contents of which are hereby incorporated by reference herein.

TECHNICAL FIELD

Embodiments pertain to wireless communications. Some embodiments relate to user equipment (UE)-Evolved Node-B (eNodeB) signaling information.

BACKGROUND

Wireless mobile devices or user equipments (UEs) may communicate with each other using radio access technologies such as the 3GPP Long-Term Evolution ("LTE") standard, 3GPP LTE Advanced Release 12 (March 2014) (the "LTE-A Standard"), the IEEE 802.16 standard, IEEE Std. 802.16-2009, published May 29, 2009 ("WiMAX"), as well as any other wireless protocols that are designated as 3G, 4G, 5G, and beyond. Technologies such as device-to-device (D2D), sensor networks or Internet of Things (IoT) (which describes interconnecting uniquely identifiable embedded computing devices within the internet infrastructure) can utilize user equipments (UEs) comprising coverage-constrained capabilities, and thus may have limited connectivity to corresponding eNodeBs.

BRIEF DESCRIPTION OF THE DRAWINGS

FIG. 5B illustrates a discovery period for network nodes to transmit discovery signals in accordance with some embodiments.

DETAILED DESCRIPTION

The following description and the drawings sufficiently illustrate specific embodiments to enable those skilled in the art to practice them. Other embodiments can incorporate structural, logical, electrical, process, and other changes. Portions and features of some embodiments can be included in, or substituted for, those of other embodiments. Embodiments set forth in the claims encompass all available equivalents of those claims.

In some embodiments, mobile devices or other devices described herein can be part of a portable wireless communication device, such as a personal digital assistant (PDA), a laptop or portable computer with wireless communication capability, a web tablet, a wireless telephone, a smartphone, a wireless headset, a pager, a wearable mobile computing device (e.g., a mobile computing device included in a wearable housing), an instant messaging device, a digital camera, an access point, a television, a medical device (e.g., a heart rate monitor, a blood pressure monitor, etc.), or other device that can receive and/or transmit information wirelessly. In some embodiments, the mobile device or other device can be a user equipment (UE) or an Evolved Node-B (eNodeB) configured to operate in accordance with 3GPP standards (e.g., the 3GPP Long Term Evolution ("LTE") Advanced Release 12 (March 2014) (the "LTE-A Standard")). In some embodiments, the mobile device or other device can be configured to operate according to other protocols or standards, including IEEE 802.11 or other IEEE and 3GPP standards. In some embodiments, the mobile device or other device can include one or more of a keyboard, a display, a non-volatile memory port, multiple antennas, a graphics processor, an application processor, speakers, and other mobile device elements. The display can be a liquid crystal display (LCD) screen including a touch screen.

Figure 1:
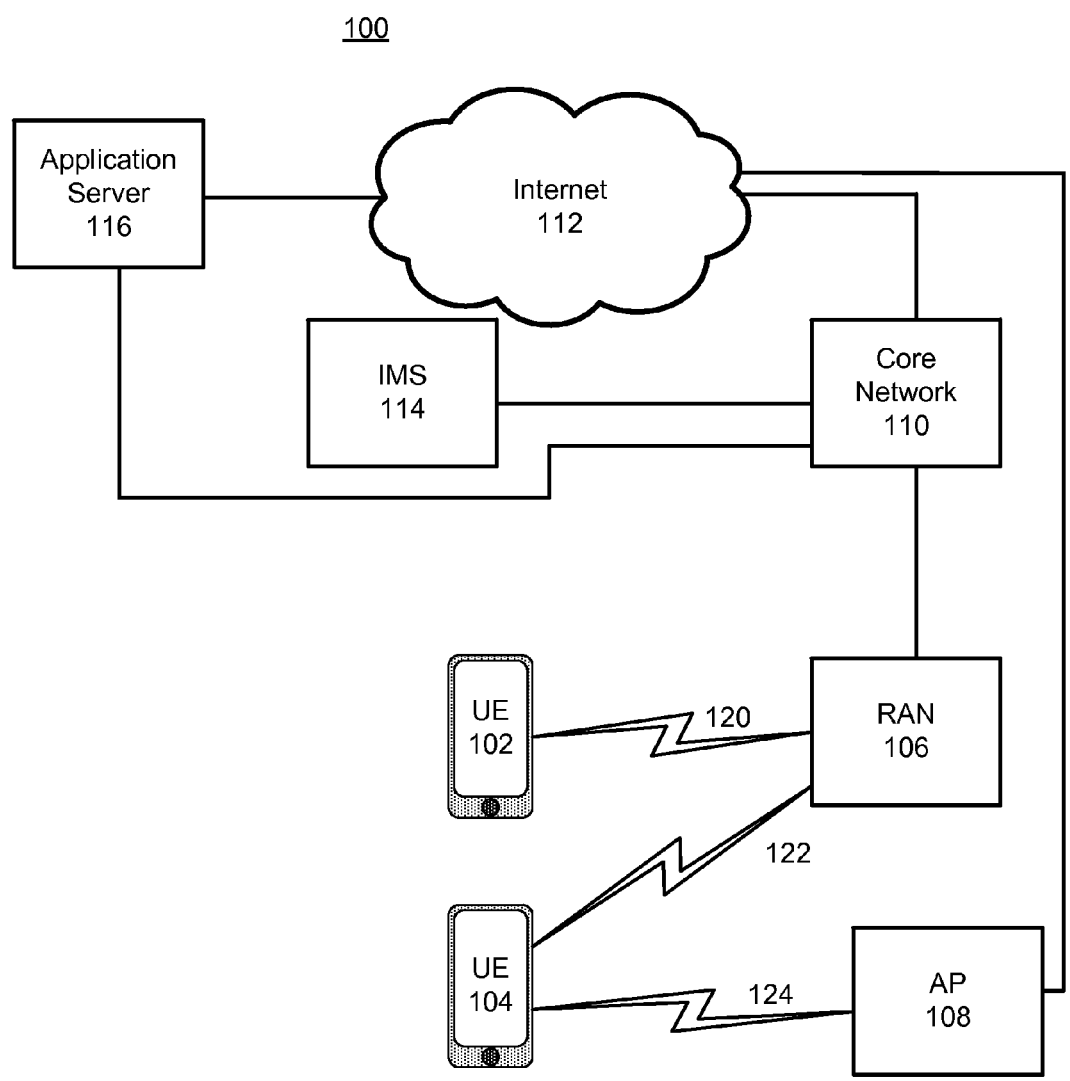
FIG. 1 illustrates an architecture of a wireless network with various components of the network, in accordance with some embodiments.

FIG. 1 illustrates an architecture of a wireless network with various components of the network, in accordance with some embodiments. A system 100 is shown to include a UE 102 and a UE 104. The UEs 102 and 104 are illustrated as smartphones (i.e., handheld touchscreen mobile computing devices connectable to one or more cellular networks), but can also include PDAs, pagers, laptop computers, desktop computers, and the like.

The UEs 102 and 104 are configured to access a radio access network (RAN) 106 via connections 120 and 122, respectively, each of which comprise a physical communications interface or layer; in this example, the connections 120 and 122 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP LTE protocol, and the like.

The RAN 106 can include one or more access points that enable the connections 120 and 122. These access points (described in further detail below) can be referred to as access nodes, base stations (BSs), NodeBs, eNodeBs, and so forth, and can comprise ground stations (i.e., terrestrial access points) or satellite access points providing coverage within a geographic area (i.e., a cell). The RAN 106 is shown to be communicatively coupled to a core network 110. The core network 110 can be used to enable a packet-switched data exchange with the Internet 112 in addition to bridging circuit switched calls between the UEs 102 and 104. In some embodiments, the RAN 106 can comprise an Evolved UMTS (Universal Mobile Telecommunications System)

Terrestrial Radio Access Network (E-UTRAN), and the core network 110 can comprise an Evolved Packet Core (EPC) network.

The UE 104 is shown to be configured to access an access point (AP) 108 via connection 124. The connection 124 can comprise a local wireless connection, such as a connection consistent with IEEE 802.11, wherein the AP 108 would comprise a wireless fidelity (WiFi) router. In this example, the AP 108 is shown to be connected to the Internet 112 without connecting to the core network 110.

The Internet 112 is shown to be communicatively coupled to an application server 116. The application server 116 can be implemented as a plurality of structurally separate servers or can be included in a single server. The application server 116 is shown as connected to both the Internet 112 and the core network 110; in other embodiments, the core network 110 connects to the application server 116 via the Internet 112. The application server 116 can also be configured to support one or more communication services (e.g., Voice-over-Internet Protocol (VoIP) sessions, PTT sessions, group communication sessions, social networking services, etc.) for UEs that can connect to the application server 116 via the core network 110 and/or the Internet 112.

The core network 110 is further shown to be communicatively coupled to Internet Protocol (IP) Multimedia Subsystem (IMS) 114. The IMS 114 comprises an integrated network of telecommunications carriers that can enable the use of IP for packet communications, such as traditional telephony, fax, e-mail, internet access, VoIP, instant messaging (IM), videoconference sessions and video on demand (VoD), and the like.

Figure 2:
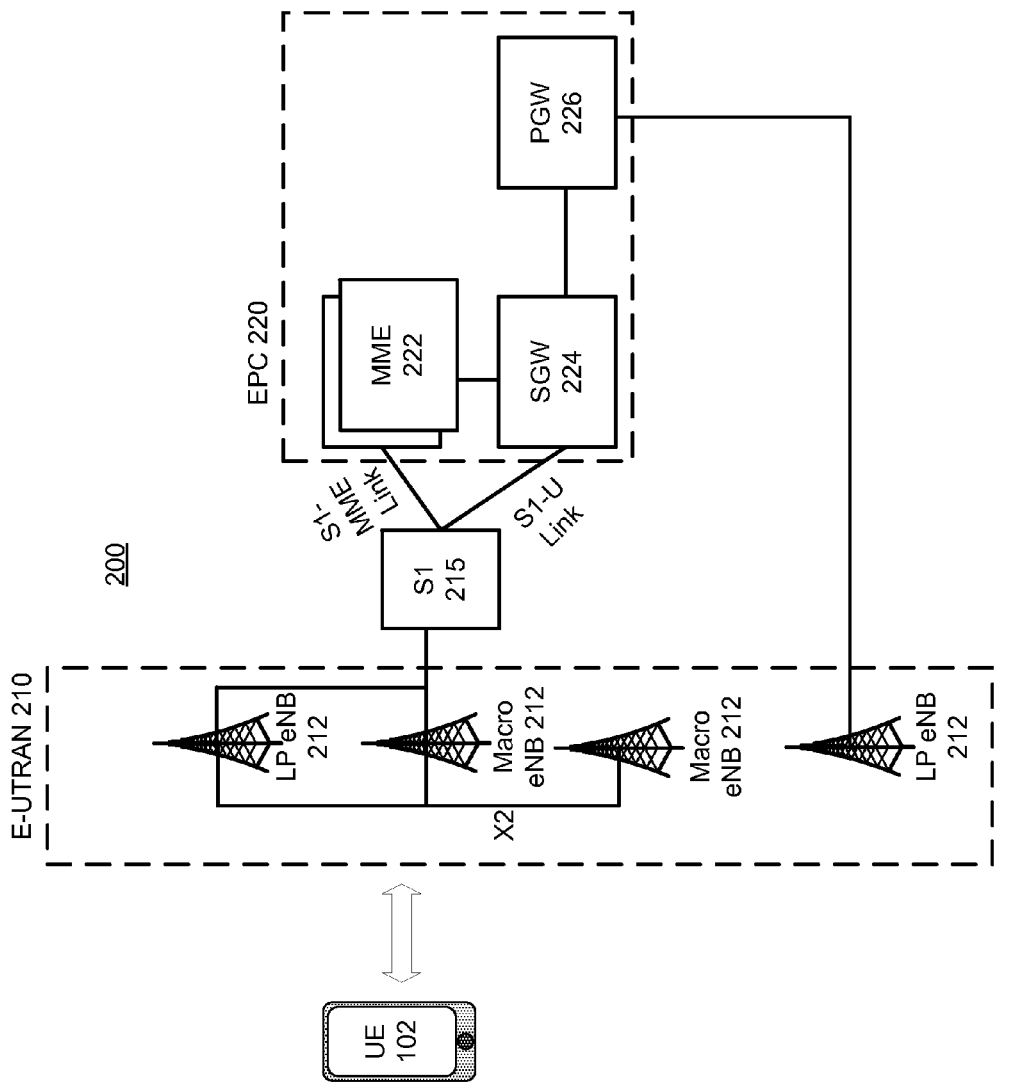
FIG. 2 illustrates an architecture of components of an LTE network, in accordance with some embodiments.

FIG. 2 illustrates an architecture of components of an LTE network, in accordance with some embodiments. In this example, (sub)system 200 comprises an Evolved Packet System (EPS) on an LTE network, and thus includes an E-UTRAN 210 and an EPC network 220 communicatively coupled via an S1 interface 215. In this illustration, only a portion of the components of E-UTRAN 210 and the EPC network 220 are shown. Some of the elements described below may be referred to as "modules" or "logic." As referred to herein, "modules" or "logic" may describe hardware (such as a circuit), software (such as a program driver) or a combination thereof (such as a programmed microprocessing unit).

The E-UTRAN 210 includes eNodeBs 212 (which can operate as base stations) for communicating with one or more UEs (e.g., the UE 102). The eNodeBs 212 are shown in this example to include macro eNodeBs and low power (LP) eNodeBs. Any of the eNodeBs 212 can terminate the air interface protocol and can be the first point of contact for the UE 102. In some embodiments, any of the eNodeBs 212 can fulfill various logical functions for the E-UTRAN 210 including but not limited to radio network controller (RNC) functions such as radio bearer management, uplink and downlink dynamic radio resource management and data packet scheduling, and mobility management. eNodeBs in EPS/LTE networks, such as the eNodeBs 212, do not utilize a separate controller (i.e., an RNC) to communicate with the EPC network 220; in other embodiments utilizing other specification protocols, RANs can include an RNC to enable communication between BSs and core networks.

In accordance with some embodiments, the UE 102 can be configured to communicate using Orthogonal Frequency-Division Multiplexing (OFDM) communication signals with any of the eNodeBs 212 over a multicarrier communication channel in accordance various communication techniques, such as an Orthogonal Frequency-Division Multiple Access (OFDMA) communication technique or a Single Carrier Frequency Division Multiple Access (SC-FDMA) communication technique, although the scope of the embodiments is not limited in this respect. The OFDM signals can comprise a plurality of orthogonal subcarriers.

In accordance with some embodiments, the UE 102 can be configured to determine a synchronization reference time based on reception of one or more signals from any of the eNodeBs 212. The UE 102 can also be configured to support device-to-device (D2D) communication with other UEs using OFDMA, SC-FDMA, or other multiple access schemes.

The S1 interface 215 is the interface that separates the E-UTRAN 210 and the EPC network 220. It is split into two parts: the S1-U, which carries traffic data between the eNodeBs 212 and the serving gateway (S-GW) 224, and the S1-MME, which is a signaling interface between the eNodeBs 212 and the mobility management entities (MMEs) 222. An X2 interface is the interface between eNodeBs 212. The X2 interface can comprise two parts (not shown): the X2-C and X2-U. The X2-C is the control plane interface between the eNodeBs 212, while the X2-U is the user plane interface between the eNodeBs 212.

With cellular networks, low power cells can be used to extend coverage to indoor areas where outdoor signals do not reach well, or to add network capacity in areas with very dense phone usage, such as train stations. As used herein, the term "LP eNodeB" refers to any suitable relatively low power eNodeB for implementing a narrower cell (i.e., narrower than a macro cell) such as a femtocell, a picocell, or a micro cell at the edge of the network. Femtocell eNodeBs are typically provided by a mobile network operator to its residential or enterprise customers. A femtocell is typically the size of a residential gateway or smaller, and generally connects to the user's broadband line. Once plugged in, the femtocell connects to the mobile operator's mobile network and provides extra coverage in a range of typically 30 to 50 meters for residential femtocells. Thus, an LP eNodeB might be a femtocell eNodeB since it is coupled through the packet data network gateway (PGW) 226. Similarly, a picocell is a wireless communication system typically covering a small area, such as in-building (offices, shopping malls, train stations, etc.) or, more recently, in-aircraft. A picocell eNodeB can generally connect through the X2 link to another eNodeB such as a macro eNodeB through its base station controller (BSC) functionality. Thus, an LP eNodeB can be implemented with a picocell eNodeB since it is coupled to a macro eNodeB via an X2 interface. Picocell eNodeBs or other LP eNodeBs can incorporate some or all functionality of a macro eNodeB. In some cases, this can be referred to as an AP BS or enterprise femtocell.

In some embodiments, a downlink resource grid can be used for downlink transmissions from any of the eNodeBs 212 to the UE 102, while uplink transmission from the UE 102 to any of the eNodeBs 212 can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this represents the smallest quantity of resources that currently can be allocated. There are several different physical downlink channels that are conveyed using such resource blocks.

The physical downlink shared channel (PDSCH) carries user data and higher-layer signaling to the UE 102. The physical downlink control channel (PDCCH) carries information about the transport format and resource allocations related to the PDSCH channel, among other things. It also informs the UE 102 about the transport format, resource allocation, and H-ARQ (Hybrid Automatic Repeat Request) information related to the uplink shared channel. Typically, downlink scheduling (assigning control and shared channel resource blocks to the UE 102 within a cell) is performed at any of the eNodeBs 212 based on channel quality information fed back from the UE 102 to any of the eNodeBs 212, and then the downlink resource assignment information is sent to the UE 102 on the control channel (PDCCH) used for (assigned to) the UE.

The PDCCH uses control channel elements (CCEs) to convey the control information. Before being mapped to resource elements, the PDCCH complex-valued symbols are first organized into quadruplets, which are then permuted using a sub-block inter-leaver for rate matching. Each PDCCH is transmitted using one or more of these CCEs, where each CCE corresponds to nine sets of four physical resource elements known as resource element groups (REGs). Four Quadrature Phase Shift Keying (QPSK) symbols are mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

The EPC network 220 includes the MMEs 222, the S-GW 224, and a PGW 226. The MMEs 222 are similar in function to the control plane of legacy Serving General packet radio service (GPRS) Support Nodes (SGSN). The MMEs 222 manage mobility aspects in access such as gateway selection and tracking area list management. The S-GW 224 terminates the interface toward the E-UTRAN 210, and routes data packets between the E-UTRAN 210 and the EPC network 220. In addition, it can be a local mobility anchor point for inter-eNodeB handovers and also can provide an anchor for inter-3GPP mobility. Other responsibilities can include lawful intercept, charging, and some policy enforcement.

The S-GW 224 and the MMEs 222 can be implemented in one physical node or separate physical nodes. The PGW 226 terminates an SGi interface toward the packet data network (PDN). The PGW 226 routes data packets between the EPC network 220 and external networks (e.g., the internet), and can be a key node for policy enforcement and charging data collection. The PGW 226 and S-GW 224 can be implemented in one physical node or separated physical nodes.

The UE 102 performs cell selection upon power-up and cell reselections throughout its operation. The UE 102 searches for a cell provided by E-UTRAN 210 (e.g., a macro cell or a picocell). During the cell reselection process, the UE 102 can measure reference signal strength for each neighboring cell (e.g., Reference Signal Received Power/ Reference Signal Received Quality (RSRP/RSRQ)) and select a cell based on this measurement (e.g., select a cell with the highest RSRP value). After the UE 102 selects a cell, it can verify the accessibility of the cell by reading the master information block (MIB). If the UE 102 fails to read the MIB of the selected cell, it can discard the selected cell and repeat the above process until a suitable cell is discovered.

A radio resource control (RRC) state indicates whether an RRC layer of the UE 102 is logically connected to an RRC layer of the E-UTRAN 210. After the UE 102 is communicatively coupled to a cell, its RRC state is RRC_IDLE. When the UE 102 has data packets to transmit or receive, its RRC state becomes RRC_CONNECTED. The UE 102, when in an RRC_IDLE state, can associate itself to different cells.

When a large number of wireless devices are present in a network, there may be scenarios where an end device does not have direct connectivity to an eNodeB(s) 212. For example, connectivity resources may be limited or devices may comprise coverage-constrained devices—e.g., devices operating primarily for machine type communication (MTC) or machine-to-machine (M2M) communications (e.g., sensor devices, controller devices, etc.) may have limited coverage and processing capabilities (similarly, devices may operate in a coverage constrained mode to limit power/resource consumption). The connectivity for such a device may be provided using a multi-hop transmission path for uplink/downlink paths to/from the eNodeB(s) 212. In other examples, a multi-hop transmission path may be more power efficient or have less of a network traffic load compared to a direct UE-eNodeB path, and thus the multi-hop transmission path is utilized.

Figure 3:
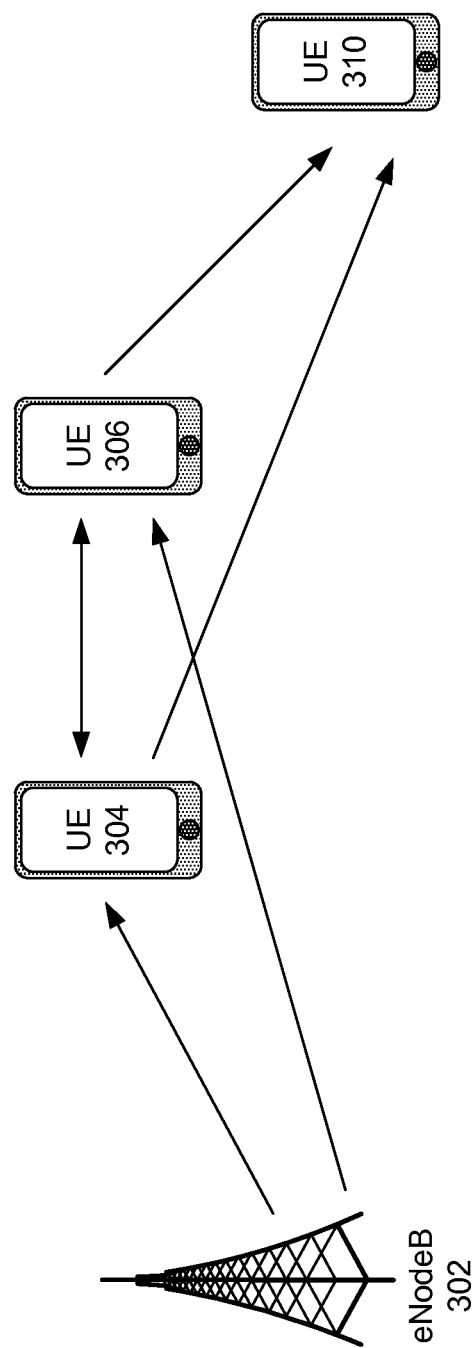
FIG. 3 is an illustration of multi-hop transmission configurations in accordance with some embodiments.

FIG. 3 is an illustration of multi-hop transmission configurations in accordance with some embodiments. In this example embodiment, an eNodeB 302 and relay UEs 304 and 306 may be used (in some form of eNodeB/relay UE combination) to provide a multi-hop uplink and/or downlink transmission path to an end UE 310 (which can alternatively be referred as an endpoint UE) that is out of coverage for the eNodeB 302. As shown in this illustration, there comprises a plurality of multi-hop transmissions paths for communicatively coupling the eNodeB 302 to the end UE 310: a two-hop path utilizing only relay UE 304, a two-hop path utilizing only relay UE 306, and three-hop paths utilizing both relay UEs 304 and 306 in any order. In other embodiments, more relay UEs may be utilized, resulting in more possible multi-hop transmissions paths.

Embodiments of the disclosure describe processes related to discovering and establishing suitable multi-hop communication paths for (endpoint) UEs. As discussed in further detail below, network-initiated discovery and path selection processes may utilize periodically transmitted reference signals along with optional assistance information. A network node, such the eNodeB 302, and other relaying-capable nodes, such as relay UEs 304 and 306, may transmit periodic reference signals. Based on these transmitted reference signals and optional assistance information, the relay UEs 304/306, the eNodeB 302, and/or the end UE 310, in any combination, may make a selection decision for previous hop paths for communication. The end UE 310 or the eNodeB 302 may make the selection decision for the end-to-end path in order to provide coverage extension for the end UE 310 using multi-hop transmission paths.

Figure 4:
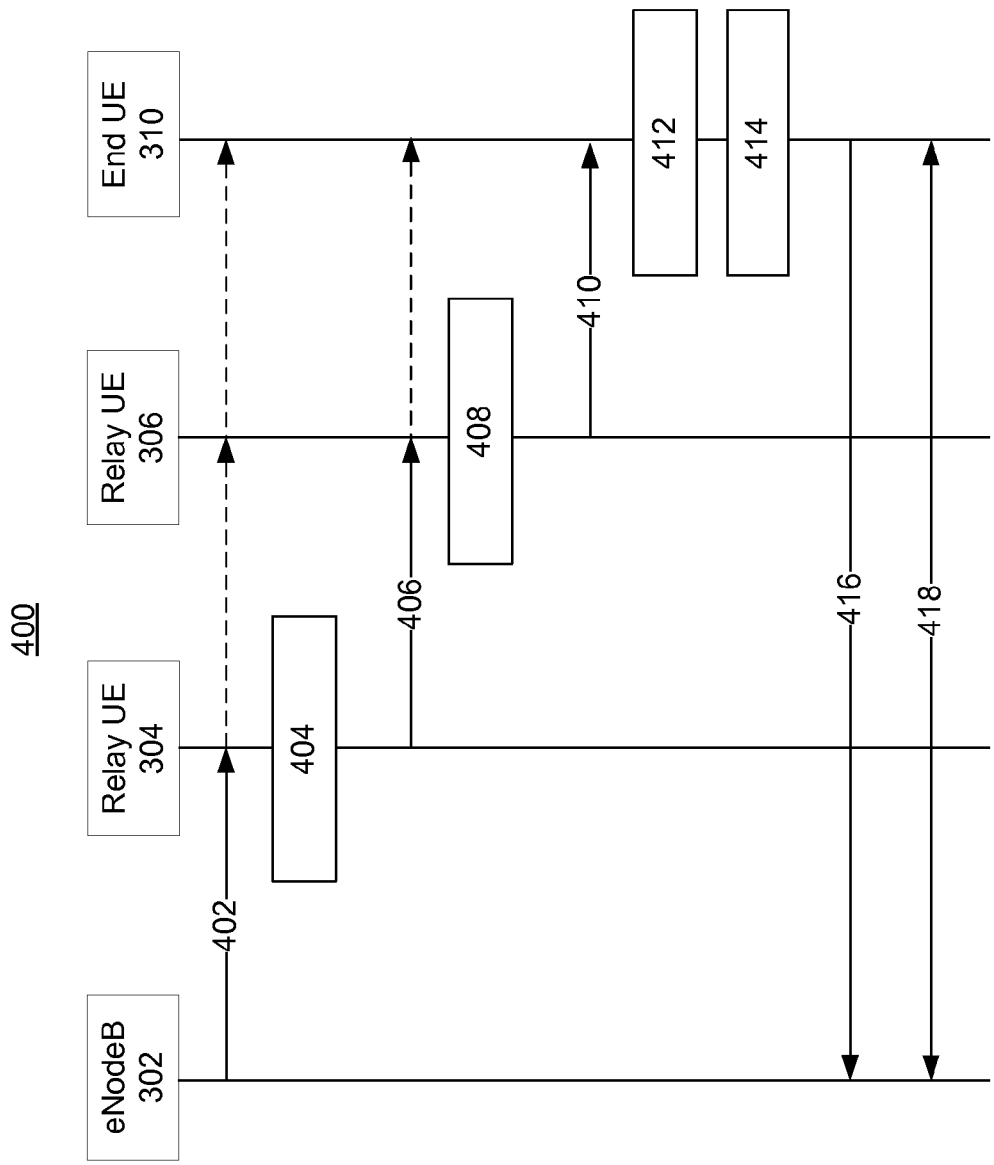
FIG. 4 is an illustration of a communications process to establish a multi-hop transmission path in accordance with some embodiments.

FIG. 4 is an illustration of a communications process to establish a multi-hop transmission path in accordance with some embodiments. Process and logical flow diagrams as illustrated herein provide examples of sequences of various process actions. Although shown in a particular sequence or order, unless otherwise specified, the order of the actions may be modified. Thus, the described and illustrated implementations should be understood only as examples, and the illustrated processes may be performed in a different order, and some actions may be performed in parallel. Additionally, one or more actions may be omitted in various embodiments; thus, not all actions are executed in every implementation. Other process flows are possible.

In this embodiment, the eNodeB 302 and the relay UEs 304 and 306 are shown to transmit reference signals and link selection assistance information. The eNodeB 302 is shown in this example to execute a transmission 402 to the relay UE 304 that includes a reference signal and, optionally, link selection information. Said reference signal may comprise a pilot-tone transmitted using a pre-determined transmission power value which may be known to the relay UE 304 by way of pre-defining in the standard or using other messaging (e.g., dedicated RRC message or broadcast SIB message) at the time of the network entry of relay UE 304 or at a later time. Reference signals may comprise periodic signals transmitted by the eNodeB 302 and the relay UEs 304 and 306. In some embodiments, references signals may be transmitted by relay UEs that are capable of functioning as relay UEs (or in some embodiments, have this capability optionally enabled). The transmitting relay UE may be identifiable from the reference signal. In some embodiments, this may be achieved by defining specific sequences to be used as a reference signal for a specific relay UE, or the network may assign specific identity sequences/signatures to each relay UE for use with/as reference signal. In other embodiments, relay identity may be sent along with the assistance information described below if the same or similar reference signal is used by multiple or all of the relay UEs. The transmission of reference signals may optionally include link selection assistance information as described below.

In this example, the eNodeB 302 executes a transmission 402 of a reference signal and assistance information to the relay UE 304. In some embodiments, the relay UE 304 may be "forced" into functioning as a relay UE via a signal from the eNodeB 302 (this decision may be made by any appropriate network node). The network may inform a UE of such compulsion using dedicated signaling (e.g., an RRC message), using a multicast message to multiple UEs, a broadcast message (e.g., a SIB (System Information Broadcast) message), etc.

The relay UE 304 processes the information from the transmission 402 (shown as operation 404), and executes a transmission 406 of a reference signal and assistance information to the relay UE 306. Direct UE-to-UE transmissions may be executed, for example, using a D2D process. In other embodiments, the relay UEs 304 and 306 may function similarly to a stripped-down version of an eNodeB, and thereby utilize LTE downlink communication processes (e.g., PDCCH transmission processes).

In some embodiments, the reference signal and/or assistance information from transmission 402 is also forwarded to the relay UE 306. In some embodiments, UEs may make a determination to not function as a relay for various reasons—e.g., their remaining battery capacity is low or their computational capacity is limited; in this situation, the UE may not execute the operation 404. The relay UE 306 may perform similar operations (i.e., processing the information from the transmission 406 (shown as operation 408), executing a transmission 410 of a reference signal and assistance information to the end UE 310).

The end UE 310 processes the received information (shown as operation 412) and makes a link selection decision (shown as block 414, although in some embodiments, the link selection decision is made by other nodes as described in further detail below). For example, the end UE 310 may select from a two-hop path utilizing only relay UE 304, a two-hop path utilizing only relay UE 306, or three-hop paths utilizing both relay UEs 304 and 306 in any order. The end UE 310 may execute a transmission 416 to notify the eNodeB 302 (either directly, or via one or more relay UEs) of the selected multi-hop path, and the eNodeB 302 may execute a transmission 418 to establish the data communication path between the eNodeB 302 and the end UE 310 using the selected link.

Figure 5A:
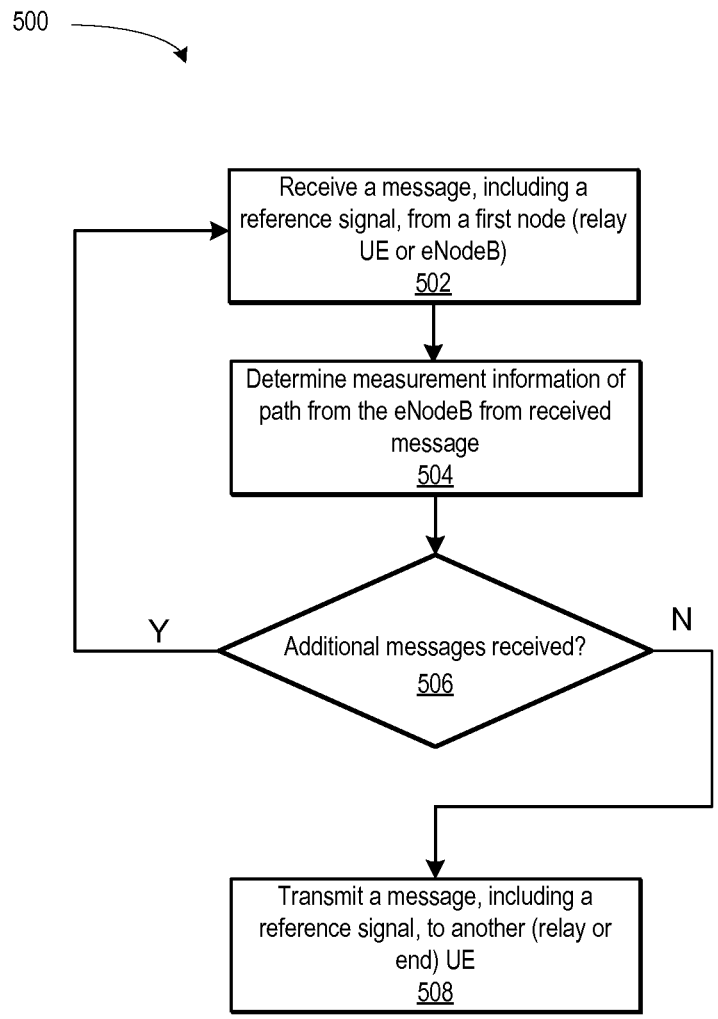
FIG. 5A is a flow diagram of a process executed by a relay UE in establishing a multi-hop transmission path in accordance with some embodiments.

The operations of the relay UEs 304/306 and the end UE 310 are described in more detail below. FIG. 5A is a flow diagram of a process executed by a relay UE in establishing a multi-hop transmission path in accordance with some embodiments. Process 500 includes executing an operation at a relay UE to receive a message from a node comprising an eNodeB or another relay UE (shown as block 502); this message includes a reference signal comprising a pre-determined signal value stored at both the relay UE and the node, and may also include additional assistance information of the transmission path from the node to the relay UE.

This assistance information may be used for assisting in making a multi-hop path selection decision; as described in further detail below, embodiments may execute a multi-hop path selection at each relay node in a multi-hop path (referred to herein as a distributed decision) or at that path endpoint (referred to herein as a centralized or semi-centralized decision). The assistance information may represent any combination of metrics of interest—e.g., current hop count to the eNodeB, potential channel capacity to the eNodeB, loading conditions (i.e., current or expected network traffic load), etc. This assistance information may be transmitted from a relay UE or from an eNodeB (although some metrics of interest, such as current hop count to the eNodeB, may be transmitted by relay UEs only). Relay UEs may update their assistance information when new reference signal/assistance information is received from other nodes or when their own parameters have changed (e.g., metrics of interest that are subject to runtime changes, such as loading conditions or remaining battery capacity).

In some embodiments, the link selection assistance information may be one or multiple value pairs indicating information type and value as shown below in (example) Table 1.

TABLE 1

Example of link selection assistance information

| Assistance Information | Description | Value Range |
|---|---|---|
| Hop Count to eNodeB | Number of hops (i.e., number of intermediate links via relay nodes/relay UEs) between the node which is transmitting the assistance information and the eNodeB (0 for the eNodeB and 1 for node having a direct link to the eNodeB). If multiple paths exist between the node which is transmitting the assistance information and the eNodeB, in one embodiment this information may be the hop count of the path with least hop count. In other embodiment, this information may be the hop count for the path that is selected based on other criteria, for example, those discussed in other embodiments. | 0 to 7 (3 bits) |
| RSS from eNodeB | Mapped to quantized value of received reference signal power from a range of possible values (similar to RSRP measurement report mapping Table 9.1.4-1 in TS 36.133). For example, 0 | 0 to 97 (7 bits) |

TABLE 1-continued

Example of link selection assistance information

| Assistance Information | Description | Value Range |
|---|---|---|
| | means RSS less than −140 dBm, 1 means RSS between −140 dBm and −139 dBm and so on with increment in 1 dBm up to 97 meaning more than or equal to −44 dBm. | |
| Path Loss to eNodeB | Similar to RSS but with a different range and same or different quantization level. | 0 to 63 (6 bits) |
| Load | Based on the current load condition. It may be represented by a 4 bit value (i.e., total 16 levels). For example, 0 means lightly loaded (less than 15% loading), each next value representing 5% increment (1 means 15-20%, 2 means 20-25% . . .), up to 15 representing 85%+ loading. | 0 to 15 (4 bits) |

An operation is executed for the relay UE to determine measurement information of a transmission path from the eNodeB to the relay UE from the received message (shown as block 504). This may include updating the additional information received from (another) relay UE to include characteristics of the relay UE (e.g., update the hop count, path loss, etc.), and may include creating the above link selection assistance information if the relay UE is the first hop in an (eventual) multi-hop transmission path.

An operation is executed to determine if additional messages are received (shown as block 506), as a relay UE may receive messages from multiple nodes (e.g., referring to FIG. 3, the relay UE 306 may receive reference signals from both the eNodeB 302 and the relay UE 304). If additional messages are received, the previous operations are re-executed for each received message. Otherwise, an operation may be executed to transmit a message, including a reference signal, to another UE (i.e., a relay UE or an end UE) (shown as block 508). In some embodiments, this message may include the link selection assistance information from previous hops also along with the relay UE's own assistance information. In some embodiments, if multiple messages are received, thereby indicating to the relay UE that multiple multi-hop paths exist, the relay UE may select one of these paths and forward that path's information only. This decision process is described in further detail below with respect to FIG. 6.

When the relay UE executes the operation shown as block 508 in FIG. 5A, there is a possibility of collision (i.e., two or more relays selecting a same start offset or within the reference signal transmission time of each other). The relay UE may avoid collision of its reference signal to reduce network interference by using a listen-before-transmit strategy. For example, if the relay UE determines that a reference signal is being transmitted by a different node at the same time as its scheduled reference signal transmission, or if the relay UE detects a significant rise in interference from neighboring nodes, the relay UE may postpone the reference signal transmission. If two or more UEs transmit reference signals at the same time or within each other's transmission time, the reference signals may not be decodable by the intended recipient UEs due to collision. Therefore, the relays involved in the collision or those detecting potential collision may select different random start offsets for (re)transmission of their reference signals. In some embodiments, UEs may also repeat the reference signal multiple times within a discovery period by the same relay UE to reduce the delay and/or to increase the reliability of the discovery procedure.

Periodic discovery periods for path discovery may be predefined during which the eNodeBs and/or relay UEs transmit their reference signals and assistance information as applicable. FIG. 5B illustrates a discovery period for network nodes to transmit discovery signals in accordance with some embodiments. A discovery period 550 is shown to be a pre-defined time frame where relay UEs and end UEs may listen for discovery reference signals. In this embodiment the time length of the discovery period 550 is less than the time period of the interval between the start of the discovery periods 550 and 560 (i.e., the time frame 559 between the start of the discovery period 550 and the discovery period 560), providing a way for reducing power consumption and/or improving the battery life of the relay/end UEs by limiting the amount of time the discovery signals 551-553 are to be transmitted or expected by receiving UEs in the discovery cycle time frame 559.

The reference signals transmitted from relay UEs/eNodeBs may be transmitted using predefined control channel(s). Each relay UE/eNodeB may transmit discovery reference signals after a certain start offset time from the starting boundary of a discovery period. In this example, a discovery reference transmission offset 555 for reference signal 551 is shown to be included in the discovery periods 550 and 560 (other embodiments may utilize more offset values).

In some embodiments, an eNodeB may transmit the discovery reference transmission offsets 555, 556, and 557 (other embodiments may utilize more offset values) for reference signals 551, 552, and 553, respectively to various relay UEs for periodic signaling; the eNodeB may also have an offset value to be used for transmission of its discovery signals. In this embodiment, relay UEs may be registered to/authenticated by the network before the start of a discovery process. The eNodeB may ensure that the offset for each relay UE is sufficiently distant in time or that the relay UEs are using different frequency channels such that there is no collision during the transmission time of reference signals and the (optional) path selection assistance information.

In other embodiments, each relay UE may randomly select its own start offset for its reference signal transmissions. If a collision or a potential collision with other relay UEs' reference signal transmissions is detected, the relay UE may randomly re-select another start offset.

Figure 6:
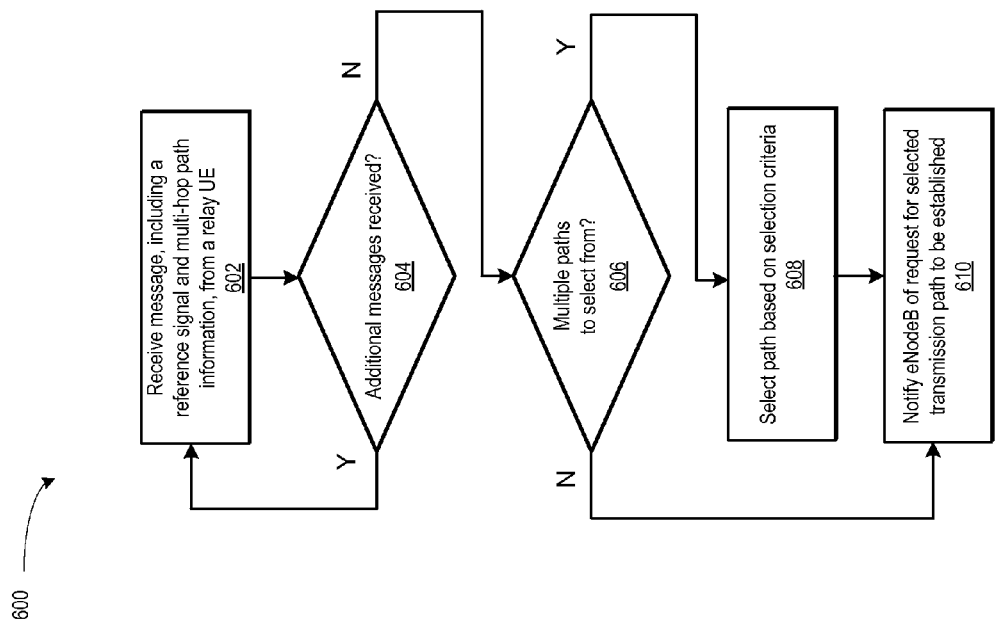
FIG. 6 is a flow diagram of a process for establishing a multi-hop transmission path for an end UE in accordance with some embodiments.

FIG. 6 is a flow diagram of a process for establishing a multi-hop transmission path for an end UE in accordance with some embodiments. In this embodiment, process 600 includes executing an operation for an end UE to receive a message from a relay UE (shown as block 602); the received message includes a reference signal comprising a pre-determined signal value stored at both the end UE and the relay UE, as well as transmission path information comprising path information for a multi-hop transmission path from an eNodeB to the relay UE. As discussed above, said multi-hop transmission path may comprise a multiple relay UE path, and the path information may include specific details about this path (e.g., node count, path loss, etc.).

An operation is executed to determine if additional messages from other relay UEs are received (shown as block 604). When there are no remaining messages, the end UE determines if there are multiple paths to select from (shown as block 606) based on the received message(s) from the relay UE(s).

If there are multiple paths to select from, one of the endpoint network nodes executes an operation to select a transmission path (shown as block 608). As discussed above, relay UEs may process and forward assistance information in various embodiments, and thus the path selection strategy for end UEs (or relay UEs, if distributed decision making is implemented) may vary across different embodiments.

The selected transmission path may comprise a multi-hop path or a direct path (if available). It is possible that a multi-hop path is selected even when a direct eNodeB-end UE path exists. For example, network traffic load conditions on a direct eNodeB-end UE path may be better/favorable compared to a multi-hop transmission path, or a multi-hop path may be more power efficient; for example, an endpoint UE may have limited power resources, whereby connecting to a nearby relay UE having sufficient power resources would utilize less power for the endpoint UE.

In some embodiments, each UE (i.e., a relay or an end UE) makes selection of its immediately previous node only. In other words, each UE selects the best previous node from its own perspective based on any applied link selection criteria, such as the exemplary embodiments discussed below. This way the decision-making for end-to-end link selection is performed in a distributed manner. For these embodiments, relay UEs may broadcast assistance information about relay-to-eNodeB links. These embodiments are scalable—i.e., the number of broadcast signals/messages is independent of the number of end UEs.

In some embodiments, the assistance information is forwarded by the relay UEs to subsequent nodes until the end UE is reached, wherein link selection is performed in a centralized manner. The forwarded information may be information about all links in the previous hops or information about only the eNodeB path to the transmitted relay UE.

In some of these embodiments utilizing a centralized decision making process, the end UE then makes end-to-end link selection decisions based on the available information. In other embodiments, the end UE feeds back this information to the eNodeB using dedicated/control channels, and the eNodeB subsequently makes the link selection decision. As discussed above, the information forwarded by the relay UE(s) to the end UE(s) may be information about all links in the previous hops or information about only the eNodeB path to the transmitting relay UE. When the information about all links is forwarded, link adaptation/resource allocation can be optimized. The eNodeB may define a network cost (or utility) function and optimize to make path selection decisions to multiple UEs at the same time. However, this involves more messages and therefore high overhead. In these embodiments, the number of messages has a quadratic relation with the number of relays, and a linear relation with the number of end UEs. When information about only the eNodeB path to the transmitted relay UE is forwarded to the end UE, the centralized decision involves lower complexity/overhead.

Thus, the link selection decision may be performed in a distributed, centralized or a semi-centralized (i.e., hybrid) manner. For these embodiments, the decision is based on the link selection criteria being used. Some examples of such criteria are given below.

Hop-count: Link with lowest hop count between eNodeB and the end UE is selected $$\text{link}_{selected} = \underset{link}{\mathrm{argmin}}(hopCount_{link}) \quad \text{(A)}$$

Reference Signal Strength (RSS): Link with highest RSS is selected $$\text{link}_{selected} = \underset{link}{\mathrm{argmax}}(RSrxPower_{link}) \quad \text{(B)}$$

Potential Channel Capacity: Link with highest potential channel capacity based on available potential BW (bandwidth) (which is based on loading conditions) is selected. As an example, $$\text{link}_{selected} = \underset{link}{\mathrm{argmax}}\left((1 - load_{link}), BW_{link} \cdot \log\left(1 + \frac{TxPower_{link} \times PathLoss_{link}}{Noise}\right)\right) \quad \text{(C)}$$

where, $$PathLoss_{link} = (RStxPower - RSrxPower)_{link} \quad \text{(D)}$$

Path loss based on last hop: Link with minimum path loss from the immediately previous node is selected $$\text{link}_{selected} = \underset{link}{\mathrm{argmin}}(PathLoss_{link}) \quad \text{(E)}$$

Load conditions, e.g., select the least loaded path:

$$\text{link}_{selected} = \underset{link}{\mathrm{argmin}}(txLoad_{link}) \quad \text{(F)}$$

Multi-criterion, i.e., define a cost (or utility) function of multiple criteria and optimize it. For example, $$\text{link}_{selected} = \underset{link}{\mathrm{argmin}}(Cost_{link}) \quad \text{(G)}$$

where $$Cost_{link} = w_1 \cdot hopCount_{link} + w_2 \cdot PathLoss_{link} + w_3 \cdot txLoad_{link} \quad \text{(H)}$$

and $$\sum_{n=1}^{3} w_n = 1. \quad \text{(I)}$$

It is possible that, due to asymmetry in uplink and downlink paths (e.g., a UE is in-coverage in downlink but out-of-coverage in uplink due to its limited transmission power), different link selection criteria may be used for downlink and uplink path selection, thereby resulting in asymmetric paths in the uplink and downlink. As an example, the selected downlink path may be a direct path while the uplink path may be a multi-hop transmission path.

An operation is executed to notify the eNodeB of a request for the selected transmission path to be established (shown as block 610). In embodiments where the end UE and/or the relay UE(s) selects a multi-hop transmission path, the end UE sends a path establishment request to set up the multi-hop link to the eNodeB; the end UE may use the selected link to send this information. For embodiments where the eNodeB selects a multi-hop or direct transmission path, the eNodeB receives the information used to select the transmission path, and then subsequently establishes the path for the end eNodeB.

Figure 7:
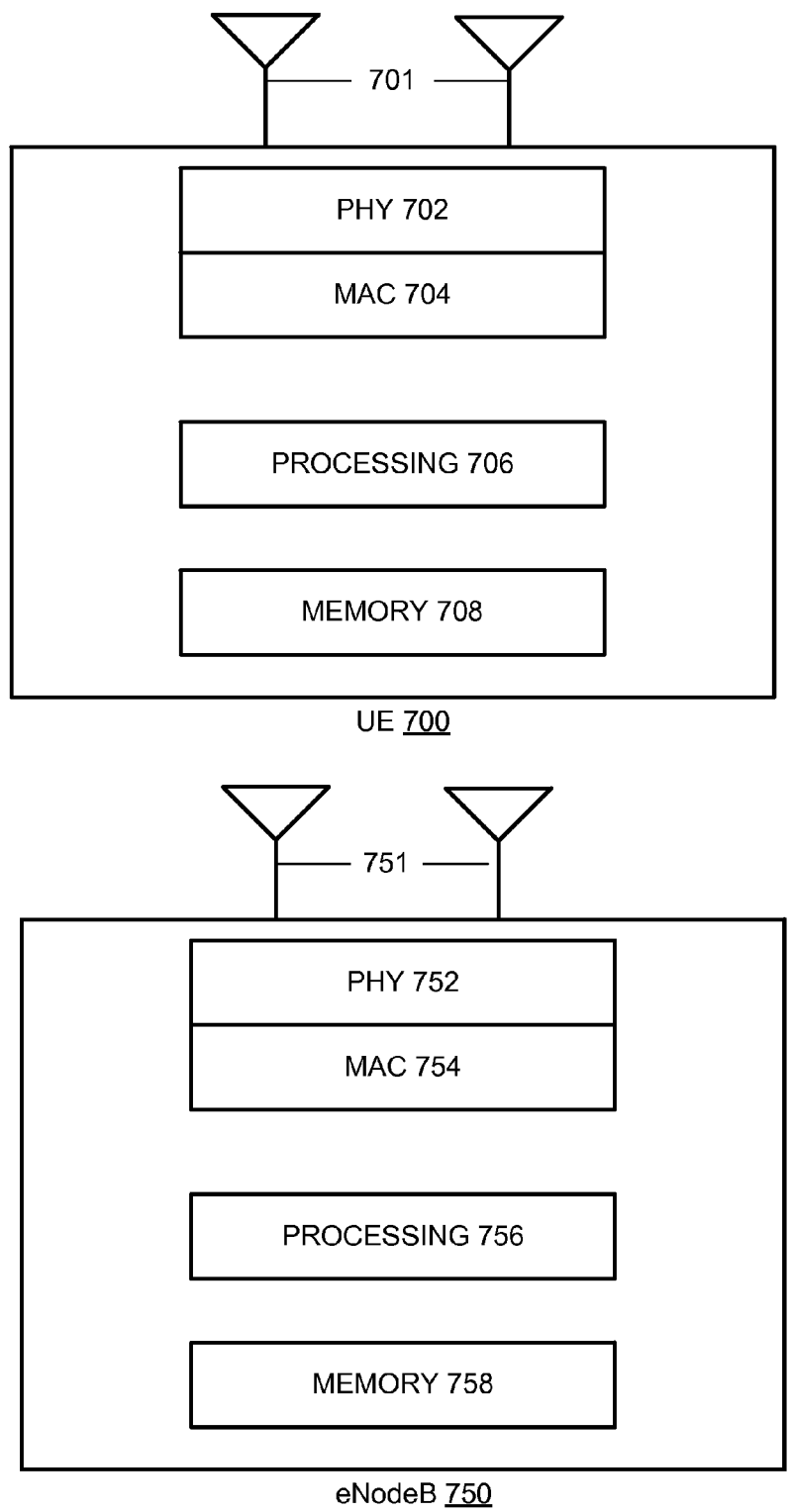
FIG. 7 shows a block diagram of a user equipment and an eNodeB in accordance with some embodiments.

FIG. 7 shows a block diagram of a UE 700 and an eNodeB 750, in accordance with some embodiments. It should be noted that in some embodiments, the eNodeB 750 can be a stationary (non-mobile) device. The UE 700 can include physical layer circuitry (PHY) 702 for transmitting and receiving signals to and from the eNodeB 750, other eNodeBs, other UEs, or other devices using one or more antennas 701, while the eNodeB 750 can include physical layer circuitry (PHY) 752 for transmitting and receiving signals to and from the UE 700, other eNodeBs, other UEs, or other devices using one or more antennas 751. The UE 700 can also include medium access control layer (MAC) circuitry 704 for controlling access to the wireless medium, while the eNodeB 750 can also include MAC circuitry 754 for controlling access to the wireless medium. The UE 700 can also include processing circuitry 706 and memory 708 arranged to perform the operations described herein, and the eNodeB 750 can also include processing circuitry 756 and memory 758 arranged to perform the operations described herein.

The antennas 701, 751 can comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 701, 751 can be effectively separated to benefit from spatial diversity and the different channel characteristics that can result.

Although the UE 700 and eNodeB 750 are each illustrated as having several separate functional elements, one or more of the functional elements can be combined and can be implemented by combinations of software-configured elements, such as processing elements including digital signal processors (DSPs), and/or other hardware elements. For example, some elements can comprise one or more microprocessors, DSPs, field-programmable gate arrays (FPGAs), application specific integrated circuits (ASICs), radio-frequency integrated circuits (RFICs), and combinations of various hardware and circuitry for performing at least the functions described herein. In some embodiments, the functional elements can refer to one or more processes operating on one or more processing elements.

Embodiments can be implemented in one or a combination of hardware, firmware, and software. Embodiments can also be implemented as instructions stored on a computer-readable storage device, which can be read and executed by at least one processor to perform the operations described herein. A computer-readable storage device can include any non-transitory mechanism for storing information in a form readable by a machine (e.g., a computer). For example, a computer-readable storage device can include read-only memory (ROM), random-access memory (RAM), magnetic disk storage media, optical storage media, flash-memory devices, and other storage devices and media. Some embodiments can include one or more processors and can be configured with instructions stored on a computer-readable storage device.

In accordance with embodiments, the UE 700 can operate in accordance with a D2D communication mode. The UE 700 can include hardware processing circuitry 706 configured to determine a synchronization reference time based on reception of one or more signals from the eNodeB 750. The hardware processing circuitry 706 can be further configured to, during a D2D communication session, transmit Multi-Time Transmission Interval Bundle Groups (MTBG) of data symbols during a first group of data transmission intervals (DTI) and refrain from transmission of data symbols during a second group of DTIs that is exclusive to the first group of DTIs. Starting times of the DTIs can be based at least partly on the synchronization reference time. The hardware processing circuitry 706 can be further configured to transmit, during an in-network communication session exclusive to the D2D communication session, data symbols according to a time transmission interval (TTI) reference time that is synchronized to the synchronization reference time. These embodiments are described in more detail below.

In some scenarios, the UE 700, operating in a cellular communication network, can begin to experience performance degradation for various reasons. As an example, user loading or throughput demands of the network can become high. As another example, the UE 700 can move toward or beyond the edges of coverage cells. While operating in the network, the UE 700 can actually be in communication with other UEs that are physically located in close proximity to the UE 700, although the communication can take place through the network. In addition to, or instead of, communication through the network, it can be beneficial to the UE 700 (and the other resources of the related communication system) for the UE 700 to engage in direct or D2D communication with one or more other UEs that can be within range of the UE 700. As an example, in the performance degradation scenarios described above, the D2D communication between the UE 700 and the other UEs can enable the network to off-load some of the network traffic, which can improve overall system performance.

Figure 8:
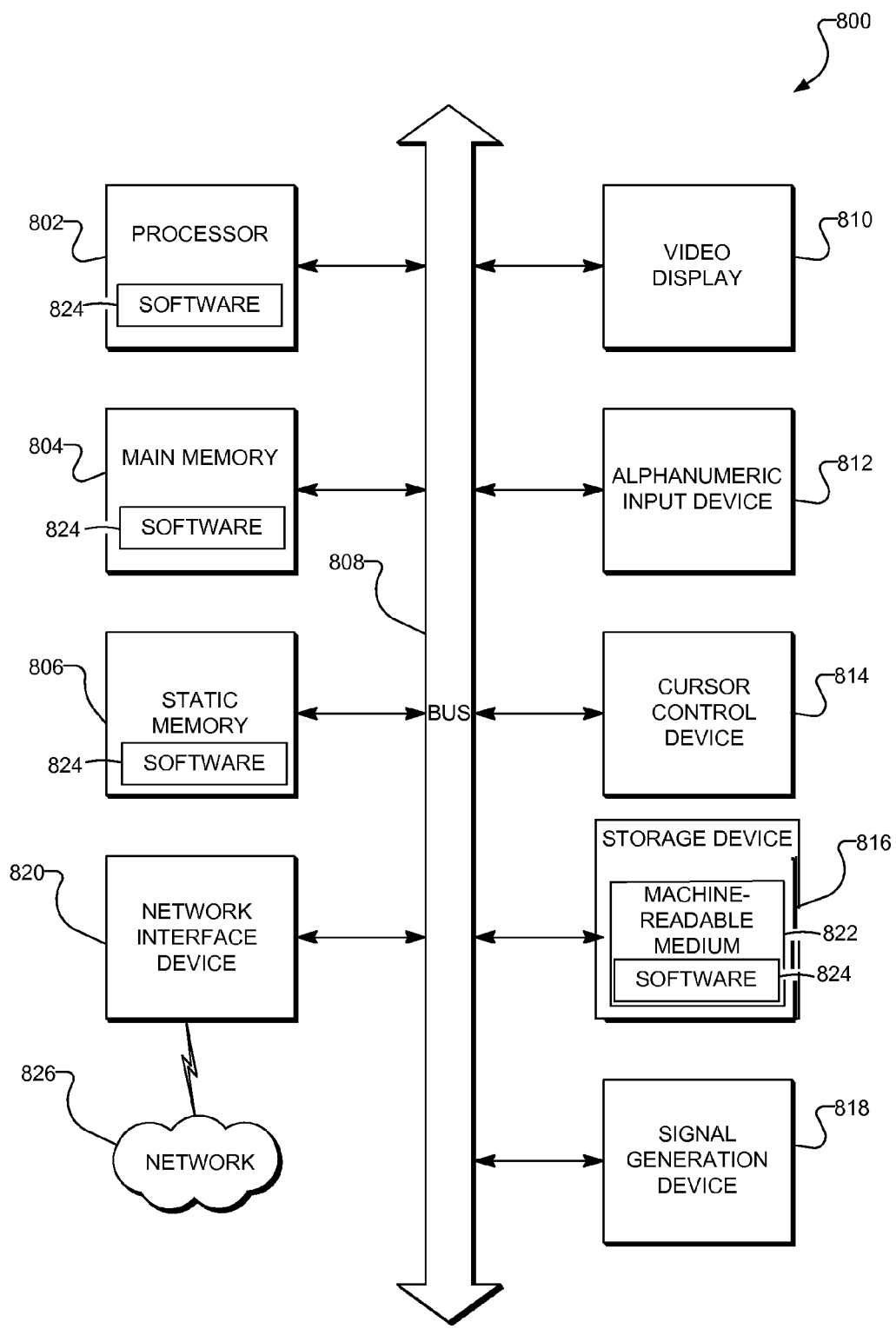
FIG. 8 is a block diagram illustrating components of a machine, according to some example embodiments, able to read instructions from a machine-readable medium and perform any one or more of the methodologies discussed herein, according to aspects of the disclosure.

FIG. 8 is a block diagram illustrating components of a machine, according to some example embodiments, able to read instructions from a machine-readable medium and perform any one or more of the methodologies discussed herein, according to aspects of the disclosure. In particular, FIG. 8 illustrates an exemplary computer system 800 (which can comprise any of the network elements discussed above) within which software 824 for causing the machine to perform any one or more of the methodologies discussed herein can be executed. In alternative embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The computer system 800 can function as any of the above described UEs or eNodeBs, and can be a personal computer (PC), a wearable mobile computing device, a tablet PC, a set-top box (STB), a PDA, a cellular telephone, a web appliance, a network router, switch or bridge, or any machine capable of executing instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804 and a static memory 806, which communicate with each other via a bus 808. The computer system 800 can further include a video display unit 810 (e.g., a LCD or a cathode ray tube (CRT)). The computer system 800 also includes an alphanumeric input device 812 (e.g., a keyboard), a user interface navigation (or cursor control) device 814 (e.g., a mouse), a storage device 816, a signal generation device 818 (e.g., a speaker), and a network interface device 820.

The storage device 816 includes a non-transitory machine-readable medium 822 on which is stored one or more sets of data structures and software 824 embodying or utilized by any one or more of the methodologies or functions described herein. The software 824 can also reside, completely or at least partially, within the main memory 804 and/or within the processor 802 during execution thereof by the computer system 800, with the main memory 804 and the processor 802 also constituting non-transitory, machine-readable media 822. The software 824 can also reside, completely or at least partially, within the static memory 806.

While the non-transitory machine-readable medium 822 is shown in an example embodiment to be a single medium, the term "machine-readable medium" can include a single medium or multiple media (e.g., a centralized or distributed database, and/or associated caches and servers) that store the one or more software 824 or data structures. The term "machine-readable medium" can also be taken to include any tangible medium that is capable of storing, encoding, or carrying instructions for execution by the machine and that cause the machine to perform any one or more of the methodologies of the present embodiments, or that is capable of storing, encoding or carrying data structures utilized by or associated with such instructions. The term "machine-readable medium" can accordingly be taken to include, but not be limited to, solid-state memories, and optical and magnetic media. Specific examples of machine-readable media 822 include non-volatile memory, including by way of example semiconductor memory devices (e.g., erasable programmable read-only Memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The software 824 can further be transmitted or received over a communications network 826 using a transmission medium. The software 824 can be transmitted using the network interface device 820 and any one of a number of well-known transfer protocols (e.g., HyperText Transfer Protocol (HTTP)). Examples of communication networks include a local area network (LAN), a wide area network (WAN), the internet, mobile telephone networks, plain old telephone service (POTS) networks, and wireless data networks (e.g., WiFi and WiMax networks). The term "transmission medium" can be taken to include any intangible medium capable of storing, encoding, or carrying instructions for execution by the machine, and includes digital or analog communications signals or other intangible media to facilitate communication of such software 824.

The drawings and the forgoing description gave examples of the present disclosure. Although depicted as a number of disparate functional items, those skilled in the art will appreciate that one or more of such elements can well be combined into single functional elements. Alternatively, certain elements can be split into multiple functional elements. Elements from one embodiment can be added to another embodiment. For example, orders of processes described herein can be changed and are not limited to the manner described herein. Moreover, the actions of any flow diagram need not be implemented in the order shown; nor do all of the acts necessarily need to be performed. Also, those acts that are not dependent on other acts can be performed in parallel with the other acts. The scope of the present disclosure, however, is by no means limited by these specific examples. Numerous variations, whether explicitly given in the specification or not, such as differences in structure, dimension, and use of material, are possible. The scope of the disclosure is at least as broad as given by the following claims.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

Some embodiments describe a user equipment (UE) configured to operate as a relay node comprising receiver circuitry configured to receive a notification of a request to establish a multi-hop transmission path communicatively coupling an eNodeB and an endpoint UE, and receive a first message, including a first reference signal, from a first network node, and transmission circuitry configured to transmit a second message to a second UE, the second message to include a second reference signal different than the first reference signal, and measurement information of a transmission path from the first network node to the UE for a second network node to use to determine whether to select the transmission path from the first network node to the UE as at least a portion of the multi-hop transmission path.

In some embodiments, the second message comprises at least one of a physical downlink control channel (PDCCH) message or a device-to-device (D2D) connection request for D2D communication between the UE and the second UE, and the UE further comprises processing circuitry configured to determine the measurement information of the transmission path from the first network node to the UE from the received first reference signal, the measurement information to include a signal power loss and/or a network traffic load of the transmission path from the first network node to the UE.

In some embodiments, the receiver circuitry is further configured to receive a third message from a third UE communicatively coupled to the eNodeB, the third message including a third reference signal different than the first and the second reference signals, and the processing circuitry is further configured to determine a second measurement information of a transmission path from the third UE to the UE from the third reference signal, the second measurement information to include a signal power loss and/or a network traffic load of the transmission path from the third UE to the UE.

In some embodiments, the second network node comprises the endpoint UE, and the second message further includes the second determined measurement information for the endpoint UE to use to determine whether to select the transmission path from the third UE to the UE as at least a portion of the multi-hop transmission path. In some embodiments, the processing circuitry is further configured to select the determined measurement information over the second determined measurement information to be included in the second message based, at least in part, on a comparison of the signal power loss and/or the network traffic load of the respective transmission paths.

In some embodiments, the first network node comprises an intermediate relay UE communicatively coupling the eNodeB to the UE, and the first message further includes measurement information of a transmission path from the eNodeB to the intermediate relay UE, and the second message further includes a hop count of the transmission path from the eNodeB to the UE.

In some embodiments, the first network node comprises the eNodeB, and the measurement information of the transmission path from the eNodeB to the UE is to include at least one of a signal power loss from the eNodeB to the UE, and/or a network traffic load from the eNodeB to the UE. In some embodiments, the second message transmitted to the second UE further includes UE hardware information and/or UE power supply information.

In some embodiments, the receiver circuitry is further configured to receive a transmission offset time value from the eNodeB to mitigate network transmission signal interference, and wherein the transmission circuitry is further configured to transmit the second message after the transmission offset time value from the start of a transmission period. In some embodiments, the transmission circuitry is further configured to transmit the second message after a randomly selected transmission offset time. In some embodiments, the transmission circuitry is further configured to periodically transmit the second message after a randomly selected transmission offset time for each periodic transmission.

In some embodiments, the UE further comprises one or more antennas used by the receiver circuitry to receive the first message and by the transmission circuitry to transmit the second message.

Some embodiments describe processing circuitry comprising operational mode circuitry to configure a user equipment (UE) to operate as a relay node comprising in response to receiving a notification of a request to establish a multi-hop transmission path communicatively coupling an eNodeB and an endpoint UE, signal processing circuitry to determine measurement information of a transmission path from a first network node to the UE based, at least in part, on a first reference signal included in a first message received from the first network node, and message generation circuitry to generate a second message for transmission to a second UE, the second message to include a second reference signal different than the first reference signal, and the determined measurement for a second network node to use to determine whether to select the transmission path from the first network node to the UE as at least a portion of the multi-hop transmission path.

In some embodiments, the second message comprises at least one of a physical downlink control channel (PDCCH) message or a device-to-device (D2D) connection request for D2D communication between the UE and the second UE, and the determined measurement information is to include a signal power loss and/or a network traffic load of the transmission path from the first network node to the UE. In some embodiments, the first network node comprises an intermediate relay UE communicatively coupling the eNodeB to the UE, and the first message further includes measurement information of a transmission path from the eNodeB to the intermediate relay UE, and the second message further includes a hop count of the transmission path from the eNodeB to the UE.

In some embodiments, the first network node comprises the eNodeB, and the determined measurement information of the transmission path from the eNodeB to the UE is to include at least one of a signal power loss from the eNodeB to the UE, and/or a network traffic load from the eNodeB to the UE.

Some embodiments described a non-transitory computer-readable storage medium that stores instructions for execution by one or more processors of a relay user equipment (UE) to perform operations to configure the relay UE to receive a first message from a network node, the network node comprising an eNodeB or a second relay UE communicatively coupled to the eNodeB, the first message including a first reference signal comprising a pre-determined signal value stored at both the relay UE and the network node, and transmit a second message to a UE, the second message to include a second reference signal comprising a pre-determined signal value stored at both the relay UE and the UE, and measurement information of a transmission path from the eNodeB to the relay UE, including at least one of a signal power loss of the transmission path from the eNodeB to the relay UE, and/or a network traffic load of the transmission path from the eNodeB to the relay UE.

In some embodiments, the relay UE is further configured to either receive a transmission offset time value from the eNodeB, and wherein the second message is transmitted after the transmission offset time value, or periodically transmit the second message after a randomly selected transmission offset time for each periodic transmission.

Some embodiments describe a user equipment (UE) comprising transceiver circuitry configured to receive a first message from a first relay UE, the first message including a first reference signal, and a first transmission path information comprising path information for a first transmission path comprising a path from an eNodeB to the first relay UE, and transmit, to the eNodeB, a path communication request for a selected transmission path, and processing circuitry configured to determine direct transmission path information of a direct transmission path from the eNodeB to the UE, and select from the direct transmission path or a multi-hop transmission path based, at least in part, on a comparison of the direct transmission path information and the first transmission path information, the multi-hop transmission path comprising a path communicatively coupling the UE to the eNodeB via one or more relay UEs including the first relay UE.

In some embodiments, the transceiver circuitry is further configured to receive a second message from a second relay UE, the second message including a second reference signal, and a second transmission path information comprising transmission path information for a second transmission path comprising a path from the eNodeB to the second relay UE, and the processing circuitry is further configured to select the first or the second transmission path for the multi-hop transmission path communication request based, at least in part, on the first and the second transmission path information.

In some embodiments, the first and second transmission path information each includes a reference signal strength (RSS) of the transmission path from the eNodeB to the respective relay UE. In some embodiments, the first and second transmission path information each includes at least one of a hop count of the transmission path from the eNodeB to the respective relay UE, a potential channel capacity of the transmission path from the eNodeB to the respective relay UE, a signal power loss of a transmission path from the eNodeB to the respective relay UE, and/or a network traffic load of the transmission path from the eNodeB to the respective relay UE, wherein the processing circuitry is further configured to select a transmission path based on any combination of the first and second transmission path information.

In some embodiments, the first and second transmission path information each includes a plurality of path data comprising two or more of a reference signal strength (RSS) of the transmission path from the eNodeB to the respective relay UE, the hop count of the transmission path from the eNodeB to the respective relay UE, a potential channel capacity of the transmission path from the eNodeB to the respective relay UE, the signal power loss of a transmission path from the eNodeB to the respective relay UE, and the network traffic load of the transmission path from the eNodeB to the respective relay UE, and the processing circuitry is further configured to select a transmission path based on a weighted combination of the path data included in the first and second transmission path information.

In some embodiments, the first and second transmission path information each includes processing capabilities of the respective relay UE, and wherein the processing circuitry is further configured to select a transmission path utilizing the relay UE with a higher processing capability.

In some embodiments, the first and second transmission path information each includes power supply information of the respective relay UE, and wherein the processing circuitry is further configured to select a transmission path utilizing the relay UE with a higher power supply.

The invention claimed is:

1. A user equipment (UE) configured to operate as a relay node, the UE comprising:
   receiver circuitry configured to:
      receive a notification of a request to establish a multi-hop transmission path communicatively coupling an eNodeB and an endpoint UE; and
      receive a first message, including a first reference signal, from a first network node; and
   transmission circuitry configured to transmit a second message to a second UE, the second message to include a second reference signal, and measurement information of a transmission path from the first network node to the UE for a second network node to use to determine whether to select the transmission path from the first network node to the UE as at least a portion of the multi-hop transmission path,
   wherein at least one of:
      the first and second reference signal respectively identifies the first network node and the UE via a unique sequence used for the first and second reference signal, or
      the first and second reference signal are the same and the first and second message respectively further comprises an identity of the first network node and the UE, and
   wherein the first and second reference signal each comprise a pilot-tone using a predetermined transmission power value indicated to the UE via one of a dedicated Radio Resource Control (RRC) message or a broadcast System Information Block (SIB) message.

2. The UE of claim 1, wherein the second message comprises at least one of a physical downlink control channel (PDCCH) message or a device-to-device (D2D) connection request for D2D communication between the UE and the second UE, and the UE further comprises:
   processing circuitry configured to determine the measurement information of the transmission path from the first network node to the UE from the received first reference signal, the measurement information to include a signal power loss and/or a network traffic load of the transmission path from the first network node to the UE.

3. The UE of claim 2, wherein the receiver circuitry is further configured to receive a third message from a third UE communicatively coupled to the eNodeB, the third message including a third reference signal different than the first and the second reference signals; and
   wherein the processing circuitry is further configured to determine a second measurement information of a transmission path from the third UE to the UE from the third reference signal, the second measurement information to include a signal power loss and/or a network traffic load of the transmission path from the third UE to the UE.

4. The UE of claim 3, wherein the second network node comprises the endpoint UE, and the second message further includes the second determined measurement information for the endpoint UE to use to determine whether to select the transmission path from the third UE to the UE as at least a portion of the multi-hop transmission path.

5. The UE of claim 3, wherein the processing circuitry is further configured to:
   select the determined measurement information over the second determined measurement information to be included in the second message based, at least in part, on a comparison of the signal power loss and/or the network traffic load of the respective transmission paths.

6. The UE of claim 1, wherein the first network node comprises an intermediate relay UE communicatively coupling the eNodeB to the UE, and the first message further includes measurement information of a transmission path from the eNodeB to the intermediate relay UE; and
   wherein the second message further includes a hop count of the transmission path from the eNodeB to the UE.

7. The UE of claim 1, wherein the first network node comprises the eNodeB, and the measurement information of the transmission path from the eNodeB to the UE is to include at least one of a signal power loss from the eNodeB to the UE, and/or a network traffic load from the eNodeB to the UE.

8. The UE of claim 1, wherein the second message transmitted to the second UE further includes UE hardware information and/or UE power supply information.

9. The UE of claim 1, wherein the receiver circuitry is further configured to receive a transmission offset time value from the eNodeB to mitigate network transmission signal interference, and wherein the transmission circuitry is further configured to transmit the second message after the transmission offset time value from a starting boundary of a discovery period that is the same for each of the first network node and the UE such that each of the first and second reference signals has a different offset from the starting boundary of the discovery period.

10. The UE of claim 1, wherein the transmission circuitry is further configured to transmit the second message after a randomly selected transmission offset time from a starting boundary of a discovery period that is the same for each of the first network node and the UE.

11. The UE of claim 10, wherein the transmission circuitry is further configured to periodically transmit the second message after the randomly selected transmission offset time for each periodic transmission.

12. The UE of claim 1, further comprising:
   one or more antennas used by the receiver circuitry to receive the first message and by the transmission circuitry to transmit the second message.

13. Processing circuitry comprising:
   operational mode circuitry to configure a user equipment (UE) to operate as a relay node comprising in response to receiving a notification of a request to establish a multi-hop transmission path communicatively coupling an eNodeB and an endpoint UE;
   signal processing circuitry to determine measurement information of a transmission path from a first network node to the UE based, at least in part, on a first reference signal included in a first message received from the first network node; and
   message generation circuitry to generate a second message for transmission to a second UE, the second message to include a second reference signal, and the determined measurement for a second network node to use to determine whether to select the transmission path from the first network node to the UE as at least a portion of the multi-hop transmission path, wherein at least one of:

the first and second reference signal respectively identifies the first network node and the UE via a unique sequence used for the first and second reference signal, or the first and second reference signal are the same and the first and second message respectively further comprises an identity of the first network node and the UE, and wherein the first and second reference signal each comprise a pilot-tone using a predetermined transmission power value indicated to the UE via one of a dedicated Radio Resource Control (RRC) message or a broadcast System Information Block (SIB) message.

14. The processing circuitry of claim 13, wherein the second message comprises at least one of a physical downlink control channel (PDCCH) message or a device-to-device (D2D) connection request for D2D communication between the UE and the second UE, and the determined measurement information is to include a signal power loss and/or a network traffic load of the transmission path from the first network node to the UE.

15. The processing circuitry of claim 13, wherein the first network node comprises an intermediate relay UE communicatively coupling the eNodeB to the UE, and the first message further includes measurement information of a transmission path from the eNodeB to the intermediate relay UE; and wherein the second message further includes a hop count of the transmission path from the eNodeB to the UE.

16. The processing circuitry of claim 13, wherein the first network node comprises the eNodeB, and the determined measurement information of the transmission path from the eNodeB to the UE is to include at least one of a signal power loss from the eNodeB to the UE, and/or a network traffic load from the eNodeB to the UE.

17. A non-transitory computer-readable storage medium that stores instructions for execution by one or more processors of a relay user equipment (UE) to perform operations to configure the relay UE to:

receive a first message from a network node, the network node comprising an eNodeB or a second relay UE communicatively coupled to the eNodeB, the first message including a first reference signal comprising a pre-determined signal value stored at both the relay UE and the network node; and transmit a second message to a UE, the second message to include:

a second reference signal comprising a pre-determined signal value stored at both the relay UE and the UE; and measurement information of a transmission path from the eNodeB to the relay UE, including at least one of a signal power loss of the transmission path from the eNodeB to the relay UE, and/or a network traffic load of the transmission path from the eNodeB to the relay UE, wherein at least one of:

the first and second reference signal respectively identifies the first network node and the UE via a unique sequence to be used for the first and second reference signal, or the first and second reference signal are the same and the first and second message respectively comprises an identity of the first network node and the UE, and wherein the first and second reference signal each comprise a pilot-tone using a predetermined transmission power value indicated to the UE via one of a dedicated Radio Resource Control (RRC) message or a broadcast System Information Block (SIB) message.

18. The non-transitory computer-readable storage medium of claim 17, wherein the relay UE is further configured to either:

receive a transmission offset time value from the eNodeB, and wherein the second message is transmitted after the transmission offset time value; or periodically transmit the second message after a randomly selected transmission offset time for each periodic transmission.

19. A user equipment (UE) comprising:

transceiver circuitry configured to:

receive a first message from a first relay UE, the first message including a first reference signal, and a first transmission path information comprising path information for a first transmission path comprising a path from an eNodeB to the first relay UE; and transmit, to the eNodeB, a path communication request for a selected transmission path; and processing circuitry configured to:

determine direct transmission path information of a direct transmission path from the eNodeB to the UE; and select from the direct transmission path or a multi-hop transmission path based, at least in part, on a comparison of the direct transmission path information and the first transmission path information, the multi-hop transmission path comprising a path communicatively coupling the UE to the eNodeB via one or more relay UEs including the first relay UE, wherein downlink and uplink path selection between the eNodeB and an endpoint UE are independent and asymmetric such that the UE is selected as a relay for one of a downlink or uplink path between the eNodeB and the endpoint UE and free from being selected as a relay for another of the downlink or uplink path between the eNodeB and the endpoint UE, and wherein the first and second reference signal each comprise a pilot-tone using a predetermined transmission power value indicated to the UE via one of a dedicated Radio Resource Control (RRC) message or a broadcast System Information Block (SIB) message.

20. The UE of claim 19, wherein the transceiver circuitry is further configured to:

receive a second message from a second relay UE, the second message including:

a second reference signal; and a second transmission path information comprising transmission path information for a second transmission path comprising a path from the eNodeB to the second relay UE; and wherein the processing circuitry is further configured to select the first or the second transmission path for the multi-hop transmission path communication request based, at least in part, on the first and the second transmission path information.

21. The UE of claim 20, wherein the first and second transmission path information each includes a reference signal strength (RSS) of the transmission path from the eNodeB to the respective relay UE.

22. The UE of claim 20, wherein the first and second transmission path information each includes at least one of:
- a hop count of the transmission path from the eNodeB to the respective relay UE;
- a potential channel capacity of the transmission path from the eNodeB to the respective relay UE;
- a signal power loss of a transmission path from the eNodeB to the respective relay UE; and/or
- a network traffic load of the transmission path from the eNodeB to the respective relay UE;
- wherein the processing circuitry is further configured to select a transmission path based on any combination of the first and second transmission path information.

23. The UE of claim 22, wherein the first and second transmission path information each includes a plurality of path data comprising two or more of:
- a reference signal strength (RSS) of the transmission path from the eNodeB to the respective relay UE;
- the hop count of the transmission path from the eNodeB to the respective relay UE;
- a potential channel capacity of the transmission path from the eNodeB to the respective relay UE;
- the signal power loss of a transmission path from the eNodeB to the respective relay UE; and
- the network traffic load of the transmission path from the eNodeB to the respective relay UE;
- wherein the processing circuitry is further configured to select a transmission path based on a weighted combination of the path data included in the first and second transmission path information.

24. The UE of claim 20, wherein the first and second transmission path information each includes processing capabilities of the respective relay UE, and wherein the processing circuitry is further configured to select a transmission path utilizing the relay UE with a higher processing capability.

25. The UE of claim 20, wherein the first and second transmission path information each includes power supply information of the respective relay UE, and wherein the processing circuitry is further configured to select a transmission path utilizing the relay UE with a higher power supply.

26. The UE of claim 1, wherein the first and second reference signal respectively identifies the first network node and the UE via a unique sequence to be used for the first and second reference signal.

27. The UE of claim 1, wherein the assistance information comprises an identity of the first network node and the UE when the same reference signal is used by the first network node and the UE.

28. The UE of claim 1, wherein the UE is configured to postpone transmission of the second reference signal transmission based on at least one of a determination that a reference signal is being transmitted by a different node at the same time as a scheduled transmission of the second reference signal or detection of a significant rise in interference from neighboring nodes.

29. The UE of claim 1, wherein downlink and uplink path selection between the eNodeB and the endpoint UE are asymmetric such that the UE is selected as a relay for one of a downlink or uplink path between the eNodeB and the endpoint UE and free from being selected as a relay for another of the downlink or uplink path between the eNodeB and the endpoint UE.

30. The UE of claim 1, wherein the UE conscripted into functioning as a relay UE in response to reception of at least one of the RRC or broadcast SIB message from a network node in the multi-hop transmission path.

* * * * *